Jan. 7, 1958  L. R. KOLLER  2,819,420
ELECTROLUMINESCENT CELL
Filed March 19, 1954
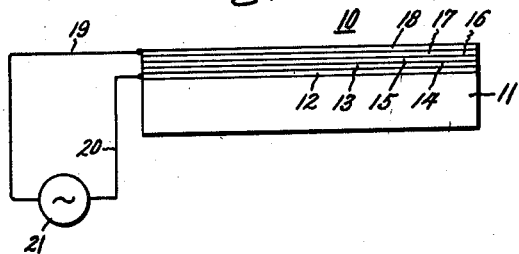
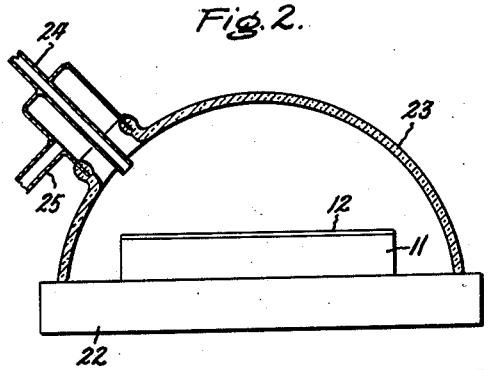
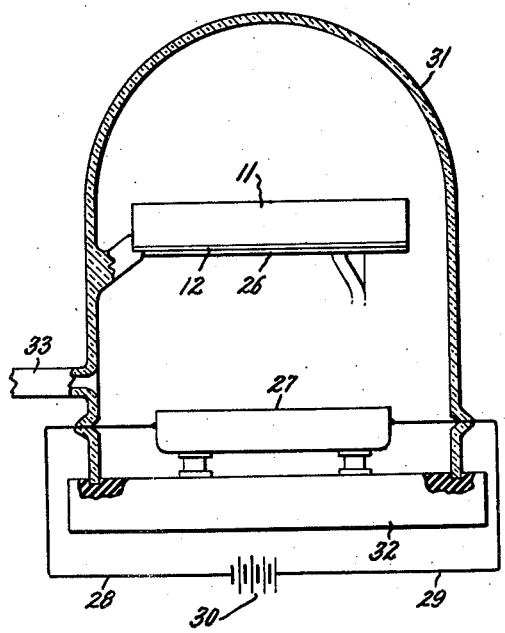
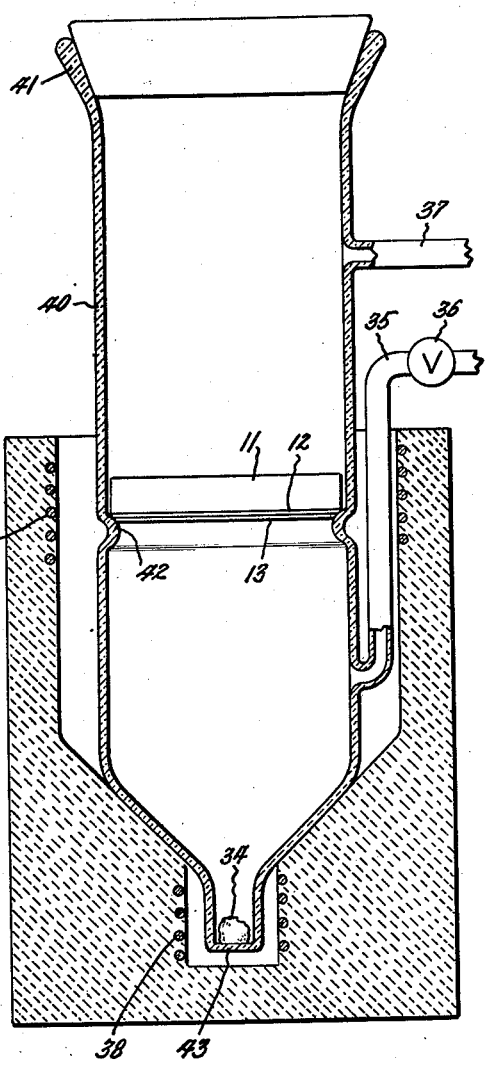
INVENTOR.
Lewis R. Koller
BY
His Attorney.

United States Patent Office 2,819,420
Patented Jan. 7, 1958

2,819,420

ELECTROLUMINESCENT CELL

Lewis R. Koller, Schenectady, N. Y., assignor to General Electric Company, a corporation of New York Application March 19, 1954, Serial No. 417,341

6 Claims. (Cl. 313—108)

This invention relates to the emission of light by the luminescence of a phosphor in an alternating electric field. More particularly, it relates to electroluminescent devices in which the light emitting medium is in the form of a continuous, non-granular, phosphor film, and the process of manufacture thereof.

In the past, electroluminescent devices have been produced in which the light emitting medium is disposed between two conducting electrodes and is in the form of discrete phosphor particles suspended in a dielectric medium. Such electroluminescent units are rather difficult to make and exhibit relatively low luminescent brightness. This relatively low brightness is apparently due in part to light absorption, characteristic of most dielectric media, and partially due to the diffusion and scattering of internal light resultant from the particulate nature of the discrete particles suspended in the dielectric.

An electroluminescent cell devised to overcome the absorption and scattering losses of such discrete particle suspensions is disclosed and claimed in my U. S. Patent 2,709,765, filed November 23, 1951, and assigned to the same assignee as the present application. The improved electroluminescent cell disclosed in U. S. Patent 2,709,765, comprises a light emitting device including a continuous non-granular phosphor film and a separate layer of dielectric material in contact with the phosphor film. In this electroluminescent cell the luminescent film is excited by voltage applied to suitable electrodes on different surface portions of the light emitting medium. The layer of dielectric material is included in such devices because a single continuous non-granular layer of phosphor has been found to possess relatively low resistivity. Because of this low resistivity, it is difficult to produce electroluminescence at voltages below the breakdown voltage of the cell. With the added dielectric film the resistivity of the light emitting device is sufficiently high to allow electroluminescence at voltages substantially below the breakdown voltage of the cell.

An object of my present invention is to produce an electroluminescent cell which has a continuous, non-granular, layer of luminescent material as its light emitting medium, and yet which does not require an additional layer of dielectric material.

A further object of my invention is to provide an electroluminescent cell having a film of luminescent material which exhibits a high resistivity, permitting luminescence at voltages substantially lower than the breakdown voltage of the cell.

Other objects will become apparent and the invention better understood from a consideration of the following description and drawings, in which:

Figure 1 shows in vertical section a luminescent unit embodying my invention.

Figures 2, 3 and 4 show apparatus by which my novel luminescent cell may be constructed.

Briefly stated, my invention comprises an electroluminescent cell having a thin film of phosphor composed of a plurality of individually deposited phosphor layers, preferably continuous, non-granular and transparent, each of which is suitably treated before the application of the succeeding layer. Such a laminated phosphor film exhibits a much greater resistivity than a film of the same thickness containing only a single layer of phosphor. This increased resistivity makes it possible to obtain electroluminescence from the cell at voltages substantially lower than the breakdown voltage of the cell without an added dielectric layer.

In connection with Figure 1 an electroluminescent cell typical of my invention is represented generally as 10. This cell is shown in vertical cross-section and may be formed upon a glass plate 11. My improved cell 10 comprises a transparent electrode 12 of conducting titanium dioxide, a plurality of successively applied transparent phosphor laminae, 13, 15, and 17 which comprise a dielectric film, and a metallic electrode 18.

The means by which the various layers comprising my electroluminescent cell are formed upon the glass plate in this example will be hereinafter more particularly described. In constructing the cell described in Figure 1 a thin layer 12, approximately 0.1 micron thick, of a transparent conducting material such as titanium dioxide is first deposited on plate 11. Such a conducting coating of titanium dioxide may be made in accordance with the method described and claimed in U. S. Patent 2,732,313 filed August 23, 1951 by D. A. Cusano and Frank J. Studer and assigned to the same assignee as the present application. This method is hereinafter described. A somewhat thicker layer 13, of an activated sulfide of zinc or of cadmium or of a mixture of sulfides of zinc and cadmium, is next deposited upon layer 12. This laminar layer may vary in thickness, but is of the order of magnitude of 2 or 3 microns. For such deposition a glass plate coated with a film of titanium dioxide is brought into close contact, within an evacuated envelope, with a heated mixture of a vapor of zinc or cadmium or of a mixture thereof and a gaseous sulphur compound such as hydrogen sulfide gas. The vapor phase reaction is carried out under reducing conditions. Reducing conditions are established by hydrogen sulfide itself where this is the sulphur containing compound used. A suitable zinc or cadmium containing vapor, for example, a vapor of metallic zinc or cadmium or a chloride of zinc or cadmium is applied in combination with the hydrogen sulfide or other suitable sulphur compounds at reaction temperatures under reducing conditions. By the deposition of the zinc sulfide layer, the titanium dioxide film 12, which originally has a high electrical resistance of the order of $10^3$ megohms per square becomes lowered to approximately 4000 ohms per square or even lower. The titanium dioxide layer is thus made sufficiently conducting to function as one electrode of my electroluminescent cell.

The deposited phosphor layer without further treatment has a low resistivity and, of itself, is not sufficient to form a dielectric in an electroluminescent cell. In my U. S. Patent No. 2,709,765, a dielectric layer was added to the cell in order to obtain a sufficiently high resistivity so that luminescence would occur at a voltage below the breakdown voltage of the cell. In accord with one feature of the present invention I have found that this step may be eliminated and a high resistivity film may be obtained if the first deposited phosphor layer is suitably treated by polishing or by etching or by other processes well known to the art in order to obtain a smooth surface and eliminate surface irregularities which may decrease the resistivity of the phosphor film, and additional laminae are added thereto. According to a preferred embodiment of my invention I provide a transparent laminated phosphor film having a plurality of light emitting laminae each of which is properly treated before the succeeding lamina is applied. Thus in Figure 1 the exposed surface of lamina 13 of activated phosphor is properly treated by polishing or etching or other means to secure a smooth interface 14. Upon the interface 14 a second lamina of activated phosphor is deposited by the same means used to deposit layer 13. This second lamina of phosphor 15 is subsequently suitably treated as by polishing or etching to provide a second interface 16 prior to the deposition of a third layer of phosphor 17.

Finally a coating 18 of suitable conductive material having a thickness approximating 0.1 micron, or somewhat greater, is applied over the last deposited phosphor layer. Conveniently the conductive coating 18 consists of an easily volatilizable material, for example, aluminum, silver, gold or copper. Such metal is deposited by volatilization by well understood methods. The use of metals having high reflectivities as, for example, aluminum, is particularly advantageous over the use of metals having low reflectivities as, for example, copper, in connection with such a transparent phosphor film. In combination with such films a highly reflective metal electrode may serve a dual purpose, namely, that of a conducting electrode and also that of a reflector for light which would otherwise escape through the "back" of the cell and be lost so far as useful light energy is concerned.

When energy of alternating voltage from the source 21 is applied by the conductors 19 and 20 to the coatings 12 and 18 functioning as electrodes, luminescent light is emitted by the laminated phosphor film comprising the individual laminae 13, 15 and 17. The brightness of the emitted light increases exponentially with the applied voltage.

As an example of one method of production which may be utilized to produce my improved electroluminescent cell reference may now be had to Figures 2, 3, and 4.

My electroluminescent cell may be constructed upon a suitable glass plate 11 which is first coated with a thin conducting layer of titanium dioxide according to the method of the aforementioned Patent 2,732,313. A suitable layer of titanium dioxide may be formed by chemical interaction of water vapor and titanium tetrachloride vapor in a closed space at atmospheric pressure. These two vapors are brought into admixture with one another in close juxtaposition to the glass plate while the latter is heated to a temperature ranging from 200 to 250° C. In connection with Figure 2, the glass plate 11 to be coated with a thin film of titanium dioxide is placed upon a hot plate 22 and covered with a bowl 23. Dry nitrogen or other suitable diluent saturated either partially or completely with titanium tetrachloride vapor is introduced into bowl 23 by means of inlet 24, and nitrogen or another suitable diluent saturated either partially or completely with water vapor is introduced by inlet 25. Interaction between these two vapors causes a thin film 12 of titanium dioxide approximating 0.1 micron in thickness to be deposited upon the glass plate 11.

A plurality of laminae of activated zinc sulfide phosphor are next added to the thin coating of titanium dioxide 12. The phosphor may be deposited by several means. I prefer to deposit the zinc sulfide laminae by vaporizing metallic zinc in an atmosphere of hydrogen sulfide so that the zinc and hydrogen sulfide vapors interact and cause a thin lamina of zinc sulfide to be formed upon the plate. With this process, however, it is necessary to supply the activator separately. A separate supply of activating manganese may be supplied as follows.

Referring to Figure 3, the glass plate 11 which has previously been coated with a thin layer of titanium dioxide 12 is suspended in a bell-jar 31 which rests upon a sealing gasket 32 and which is evacuated by vacuum line 33. A small quantity of manganese is enclosed in a molybdenum crucible 27, and suspended directly below plate 11. This crucible could also be made of tungsten or tantalum, the necessary quality being chemical stability at low and medium temperatures to prevent contamination of the manganese with the metal of which the crucible is constructed. A current from the suitable source of current 30 is passed through crucible 27 by way of leads 28 and 29. The bell-jar is first evacuated to a high vacuum of less than 0.1 micron pressure. The circuit from the voltage source 30 is closed and current passes through the molybdenum crucible 27, heating it to incandescence. The manganese contained therein is completely vaporized and a thin film of manganese is deposited upon the titanium dioxide film on the suspended glass plate. This coating of manganese is extremely thin, and its thickness is measured by its light transmitting characteristics. The proper thickness coating for the needs of this example is one which will transmit approximately 40% of incident light when exposed between a conventional light source and photocell arrangement. To secure such a thickness of manganese the light testing apparatus may be included within the vacuum jar and the evaporation process continued until the proper light transmission is attained. However, I have found that a film of manganese which will transmit 40% of incident light is obtained when 3 milligrams of powdered manganese is supplied to the molybdenum crucible 27, and the plate 11 to be coated is located approximately 14 centimeters above crucible 27. These values, however, may differ for different apparatus.

Once the phosphor activating manganese has been deposited, the next step is that of depositing activated zinc sulfide laminae. Figure 4 illustrates apparatus which may be used to deposit laminae of zinc sulfide upon the plate of this example. The apparatus includes a cylindrical flask 40 with a tapered, wide-mouth top 41, which may be vacuum sealed. An annular supporting bead 42 runs around the inside of this flask in the central portion thereof. A small cylindrical well 43 is located in the base of the flask and projects from the flask bottom so that a heating coil 38 may encircle the well and heat its contents. A small quantity of metallic zinc, say 700 milligrams, is placed in the bottom well of the flask and the plate to be coated is supported on the annular supporting bead. The tapered top is then vacuum sealed and the flask evacuated to a pressure of approximately 50 microns by means of a vacuum pump connected to the vacuum line 37. When the proper vacuum has been obtained, hydrogen sulfide gas at 300 microns pressure is admitted to flask 40 through tube 35 by valve 36. A furnace including coils 38 and 39 is raised over the lower portion of flask 40 and the circuit to coil 39 closed. When coil 39 has raised the temperature of plate 11 to a temperature from 500 to 600° C., the circuit to coil 38 is closed and the metallic zinc 34 is heated to a temperature in excess of its melting point (approximately 419° C.), by coil 38. A cloud of evaporated zinc forms above the molten zinc in well 43. The evaporated zinc and the hydrogen sulfide gas interact to form a lamina 13 of zinc sulfide upon plate 11. This deposited lamina of zinc sulfide absorbs the prior deposited layer of manganese which diffuses into the zinc sulfide and activates the phosphor.

I then remove the glass plate 11, after proper cooling, and treat the exposed surface of the zinc sulfide phosphor lamina 13 in order to produce a smooth surface 14. In this example I have used a commercial abrasive manufactured by Precision Scientific Co. of Chicago, Illinois and sold under the trade-name of Precisionite. This abrasive is substantially aluminum oxide, $Al_2O_3$. In polishing, moistened Precisionite is placed upon and spread over the surface of the lamina to be polished and a small flat circular disk is placed upon the abrasive and polishing is accomplished with a series of circular motions precessing around the periphery of the glass surface in the same manner and technique as used in lens grinding. The polishing is continued until the zinc phosphor coating which was originally semi-opaque or translucent becomes completely transparent; that is, all traces of cloudiness are removed.

When the zinc sulfide phosphor coating has been so polished, the plate 11 is washed and dried and replaced into flask 40 in Figure 4 and a second layer of zinc sulfide phosphor is deposited upon the polished surface 14 as hereinbefore described. I then remove the glass plate 11 and subject the second deposited zinc sulfide layer 15 to the above-mentioned polishing process. This process may be continued by first vapor depositing a layer of zinc sulfide and subsequently polishing the surface before vapor depositing a subsequent layer.

According to this particular example of my invention three layers of zinc sulfide phosphor were deposited to form a laminated film. After the final layer had been polished and cleaned, a thin layer of approximately 0.1 micron of metallic aluminum was deposited upon the zinc sulfide phosphor by a well known vapor deposition technique.

This specimen was found to have a total laminated film thickness of approximately 10 microns for a three layer laminated film. This sample was tested at field strengths of the order of $5 \times 10^5$ volts per centimeter and exhibited electroluminescence at this voltage. The measured resistance of this film at this field strength was found to be in excess of $10^9$ ohms giving a resistivity for the laminated film to be a value in excess of $10^{12}$ ohm centimeters as compared to a resistivity of the order of $10^8$ ohm centimeters for a single layer film of the same phosphor having the same thickness and field.

The above described example of my improved electroluminescent cell is constructed in the conventional manner with the dielectric disposed between two electrodes which contact opposite surfaces of the dielectric. However, other configurations could be used. For example, the two electrodes could be formed upon the same surface of the phosphor dielectric and insulated from one another so that a longitudinal field between the two electrodes excites the phosphor rather than a transverse field as in the device of Figure 1.

Additionally, although I have illustrated my method of construction of an electroluminescent cell in the order whereby the transparent electrode film is deposited first, the phosphor film next and finally the metallic electrode, it is evident that this order may be easily reversed in which case the last deposited transparent electrode need not be in the form of a conducting film, but could take any form which would not affect conductivity or transparency. If such an order were followed out it would be possible to eliminate the glass plate which is herein coated with the various films.

While I have described above certain specific and alternative embodiments of my invention, many modifications can be made. It is to be understood, therefore, that I intend, by the appended claims, to include all such modifications as fall within the true spirit and scope of the invention.

What I claim as new and desire to secure by Letters Patent of the United States is:

1. The method of preparing an electroluminescent cell which comprises vapor-depositing on a conducting surface, a continuous lamina of an electroluminescent phosphor compound, treating the said lamina to obtain a polished surface thereon, repeating the steps of vapor-depositing and surface treating to accumulate a plurality of treated laminae, and contacting the last deposited lamina with an electrode.

2. The method of preparing an electroluminescent cell which comprises vapor depositing a thin continuous lamina of an electroluminescent phosphor compound upon a transparent conducting surface, polishing said lamina to obtain a polished surface thereon, vapor depositing thereon at least one additional continuous lamina of an electroluminescent phosphor compound, each of which is in turn polished, and contacting the last deposited lamina with an electrode.

3. The method of preparing an electroluminescent cell which comprises vapor-depositing on a transparent conducting surface, a thin continuous transparent lamina of an electroluminescent phosphor compound, polishing the said lamina to obtain a polished surface thereon, repeating the steps of vapor-depositing and polishing to accumulate a film comprising a plurality of polished laminae of an electroluminescent phosphor compound, and depositing thereon a thin film of highly reflective metal which serves as a second electrode.

4. An electroluminescent cell produced in accordance with the method of claim 1.

5. An electroluminescent cell produced in accordance with the method of claim 2.

6. An electroluminescent cell produced in accordance with the method of claim 3.

References Cited in the file of this patent

UNITED STATES PATENTS 2,566,349   Mager _____ Sept. 4, 1951

OTHER REFERENCES

Destriau: New Phenomenon of Electrophotoluminescence, Philosoph. Mag.; Oct. 1947, vol. 38, pp. 700–702, 711–713, 723.